United States Patent
Hwang

(10) Patent No.: US 8,683,667 B2
(45) Date of Patent: Apr. 1, 2014

(54) METHOD FOR SWAGING COMPONENTS

(75) Inventor: Peter K. Hwang, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/601,473

(22) Filed: Aug. 31, 2012

(65) Prior Publication Data

US 2012/0317783 A1 Dec. 20, 2012

Related U.S. Application Data

(62) Division of application No. 12/133,646, filed on Jun. 5, 2008, now Pat. No. 8,256,079.

(51) Int. Cl.
*B23P 19/04* (2006.01)

(52) U.S. Cl.
USPC ............................................. 29/237; 29/238

(58) Field of Classification Search
USPC ............ 29/270, 278, 237–239, 235, 252, 255
See application file for complete search history.

(56) References Cited

U.S. PATENT DOCUMENTS

| | | | | |
|---|---|---|---|---|
| 4,130,932 | A * | 12/1978 | Epmeier | 29/523 |
| 5,056,351 | A | 10/1991 | Stiver et al. | |
| 5,887,860 | A | 3/1999 | Hong | |
| 6,108,885 | A | 8/2000 | Cox | |
| 6,386,532 | B1 | 5/2002 | Donovan | |
| 6,430,792 | B1 * | 8/2002 | Foster et al. | 29/237 |
| 6,473,955 | B1 | 11/2002 | Huang | |
| 6,477,757 | B2 * | 11/2002 | Viegener | 29/237 |
| 6,516,505 | B1 | 2/2003 | Taylor | |
| 6,658,711 | B1 | 12/2003 | Benson | |
| 6,823,573 | B2 * | 11/2004 | Morrison et al. | 29/237 |
| 7,155,790 | B2 * | 1/2007 | Palejwala et al. | 29/237 |
| 7,617,580 | B2 | 11/2009 | Ellis | |
| 7,665,718 | B1 | 2/2010 | Benson | |
| 8,256,079 | B2 * | 9/2012 | Hwang | 29/237 |
| 2009/0300917 | A1 * | 12/2009 | Hwang | 29/890.15 |
| 2012/0317783 | A1 * | 12/2012 | Hwang | 29/428 |

FOREIGN PATENT DOCUMENTS

| | | |
|---|---|---|
| EP | 1090244 B | 12/2004 |
| FR | 2306029 | 10/1976 |
| WO | 2008034132 A1 | 3/2008 |

OTHER PUBLICATIONS

Notice of Allowance, May 3, 2012, U.S. Appl. No. 12/133,646, 5 pages.
Response to Office Action, Feb. 22, 2012, U.S. Appl. No. 12/133,646, 15 pages.
Office Action, Nov. 23, 2011, U.S. Appl. No. 12/133,646, 11 pages.
EP Search Report, Oct. 21, 2009, Application No. 09161966.8, 7 pages.

(Continued)

*Primary Examiner* — Lee D Wilson
(74) *Attorney, Agent, or Firm* — Yee & Associates, P.C.

(57) ABSTRACT

A method for practicing a swaging operation is described. A swaging apparatus comprises a housing, a holding unit, and a moveable member. The holding unit on the housing is capable of receiving and holding an inflexible tube and a swage fitting. The moveable member is capable of moving axially along the housing with respect to an axis for the inflexible tube and the swage fitting to connect the swage fitting to the inflexible tube and create a seal between the swage fitting and the inflexible tube.

16 Claims, 6 Drawing Sheets

(56) References Cited

OTHER PUBLICATIONS

Hwang, "Apparatus for Swaging Components," U.S. Appl. No. 12/133,646, filed Jun. 5, 2008, 30 pages.

Karl, et al., "Hydraulic System Tubing—Lifelines to power and motion control," Aircraft Maintenance Technology, Apr. 2000, pp. 48-52.

* cited by examiner

METHOD FOR SWAGING COMPONENTS

This application is a divisional of application Ser. No. 12/133,646, entitled "Apparatus for Swaging Components," filed Jun. 5, 2008, status Patented Case issue date Sep. 4, 2012, U.S. Pat. No. 8,256,079.

BACKGROUND INFORMATION

1. Field

The present disclosure relates generally to manufacturing parts and in particular to a method and apparatus for connecting parts to each other. Still more particularly, the present disclosure relates to a method and apparatus for swaging a fitting to a tube.

2. Background

In manufacturing aircraft, the assembly of different systems for the aircraft may require pipes, tubing, or other materials to be connected to each other. For example, in installing a hydraulic system in an aircraft, different tubes may be connected to each other to create a seal to contain fluids, such as hydraulic fluids, for the system.

One manner in which different pieces of tubing or other assemblies that may carry fluids can be connected to each other is by swaging. Swaging is a metal forming technique in which dimensions of an item are altered using a component into which the item is forced. In these examples, a metal tube may be connected to a swage fitting. The swage fitting may deform the metal tube to create a seal between the metal tube and the swage fitting. Another end of the swage fitting may be connected to another metal tube to connect the two tubes together. Similar types of processes may be performed for installing tubing for wiring or other items within an aircraft.

The swage fitting has an axis that may be aligned around or about the axis of the tubing. This type of swage fitting is also referred to as an axial swage fitting. The swage fitting may be moved towards the tubing to deform the tubing and/or swage fitting to create a connection. In these examples, the connections may be sealed connection, such that fluids do not leak out of the connection.

Currently, tools for swaging axially swage fittings to tubes are awkward to use. The currently available tools may use a hydraulic pump. These tools and/or the hoses for the pumps along with the tools to perform swaging are moved into the interior of the aircraft to perform swaging for systems being installed. Currently, with these types of tools a swage process generally requires two persons to perform for safety and quality reasons. An axially swaged fitting may require 10,000 pounds per square inch of pressure to create the fitting. The currently used processes to create these types of fittings require time and may be expensive to use in creating connections between tubes.

Therefore, it would be advantageous to have a method and apparatus that overcomes the problems described above.

SUMMARY

The advantageous embodiments provide a method and apparatus for a swaging apparatus. The swaging apparatus comprises a housing, a holding unit, and a moveable member. The holding unit on the housing is capable of receiving and holding an inflexible tube and a swage fitting. The moveable member is capable of moving axially along the housing with respect to an axis for the inflexible tube and the swage fitting to connect the swage fitting to the inflexible tube and create a seal between the swage fitting and the inflexible tube.

In another advantageous embodiment, a tool is provided for connecting an inflexible tube to a swage fitting. The tool comprises a housing, a holding unit, a moveable cover, and a screw element. The holding unit may be formed on the housing and is capable of receiving and holding the inflexible tube and the swage fitting. The moveable cover is attached to the holding unit, wherein the moveable cover is capable of holding the inflexible tube in place when the moveable cover is in a closed position. The moveable member is capable of moving axially along the housing with respect to an axis for the inflexible tube and the swage fitting to connect the swage fitting to the inflexible tube and create a seal between the swage fitting and the inflexible tube. The screw element is located within the housing, wherein the screw element is coupled to the moveable member and is capable of moving the moveable member axially along the axis when the screw element is rotated, wherein the swage fitting deforms the inflexible tube when moved axially by the moveable member to connect the swage fitting to the inflexible tube.

In yet another advantageous embodiment, a method is used to create a connection between a swage fitting and an inflexible tube. The inflexible tube and the swage fitting are placed into a holding unit on a housing, wherein the inflexible tube and the swage fitting are axially aligned to each other. The moveable member is moved axially, wherein the movement of the moveable member towards the holding unit causes the swage fitting to deform the inflexible tube to connect the swage fitting to the inflexible tube.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
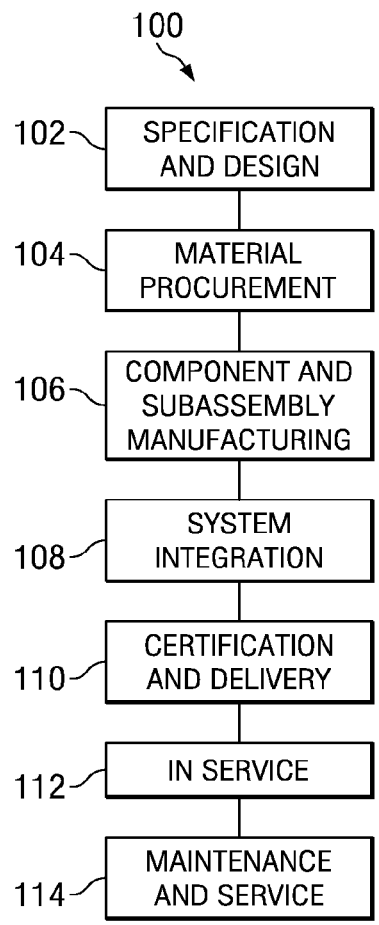
FIG. 1 is a diagram illustrating an aircraft manufacturing and service method in which an advantageous embodiment may be implemented.
Figure 2:
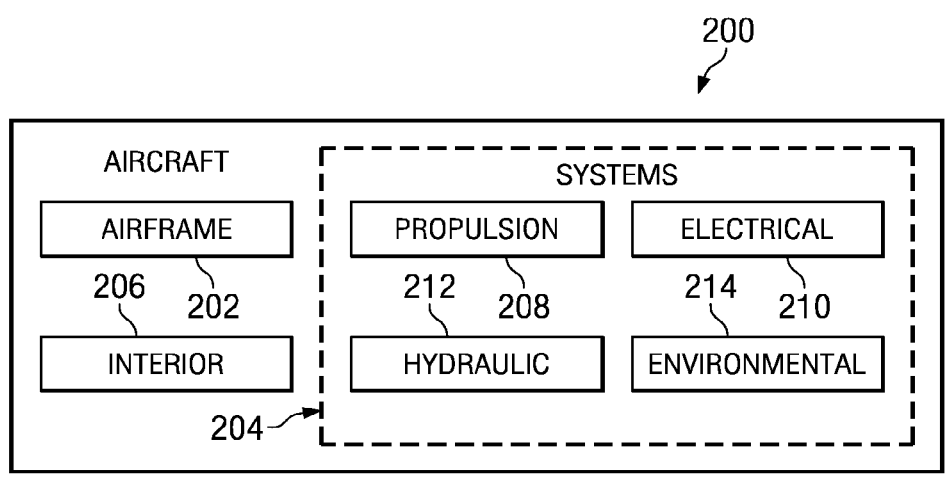
FIG. 2 is a diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment.

During pre-production, exemplary aircraft manufacturing and service method 100 may include specification and design 102 of aircraft 200 in FIG. 2 and material procurement 104. During production, component and subassembly manufacturing 106 and system integration 108 of aircraft 200 in FIG. 2 take place.

Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

As one example, a swaging apparatus in accordance with an advantageous embodiment may be used to connect tubes in installing systems during component and subassembly manufacturing 106 and system integration 108. The different advantageous embodiments may be used to connect tubing for systems such as hydraulic systems and electrical systems. Further, swaging of tubes may be performed using different advantageous embodiments during maintenance and service which tubing may be replaced, added, or otherwise manipulated.

The different advantageous embodiments recognize that a simpler method and apparatus, as compared to current methods, is needed to create connections in which the time needed to create the connection may be reduced. Further, the different advantageous embodiments also recognize that the current equipment for creating swaged fittings are bulky and hard to handle within an aircraft being constructed or modified. Some of different advantageous embodiments provide a handheld apparatus for creating these types of connections. In these examples, a handheld apparatus is an apparatus that may be held using one or two hands of an operator.

Figure 3:
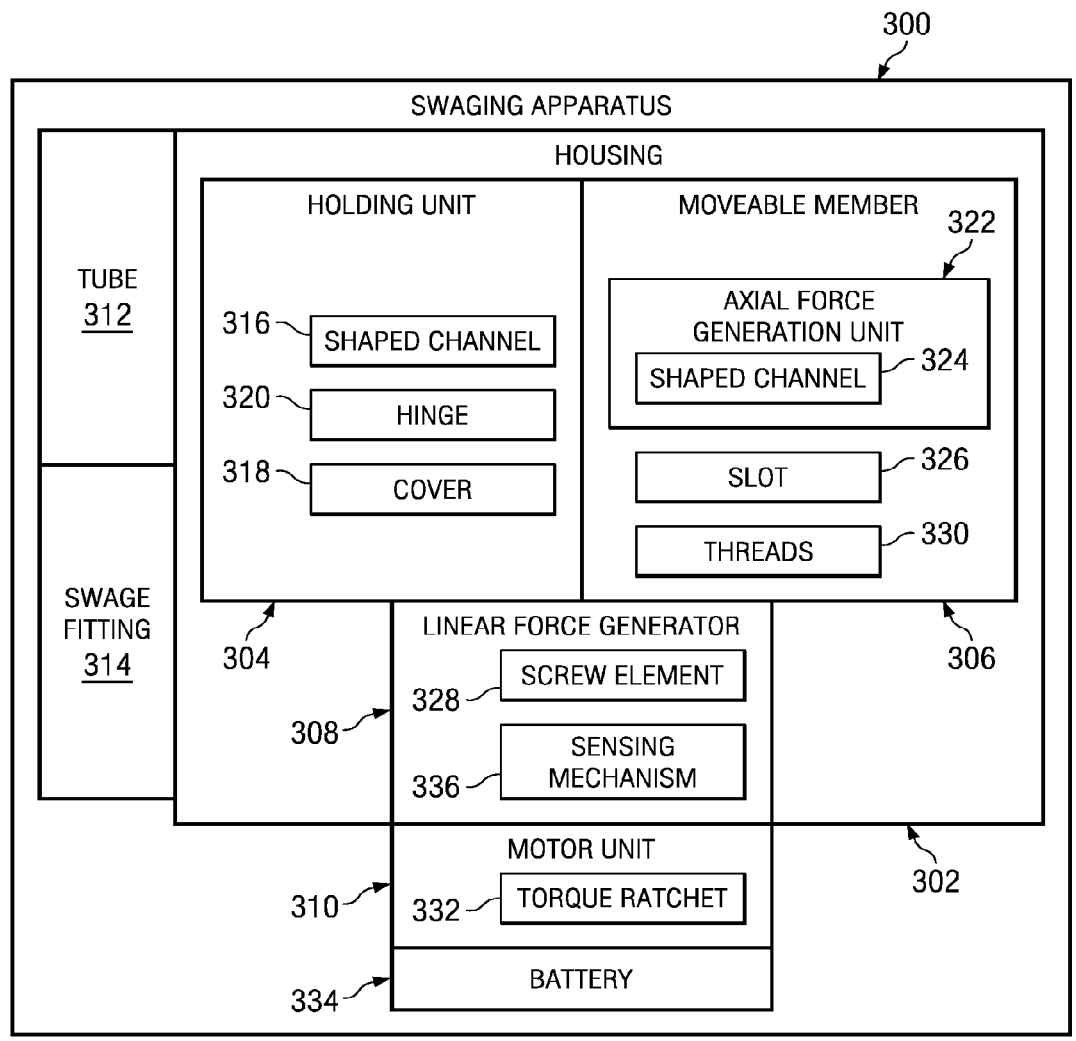
FIG. 3 is a diagram illustrating an apparatus for creating a connection using a swaged fitting in accordance with an advantageous embodiment.

With reference now to FIG. 3, a diagram illustrating an apparatus for creating a connection using a swaged fitting is depicted in accordance with an advantageous embodiment.

As illustrated, swaging apparatus 300 includes housing 302, holding unit 304, moveable member 306, and linear force generator 308. Further, swaging apparatus 300 also may include motor unit 310. Holding unit 304 may be used to hold tube 312 and swage fitting 314 in place. In these examples, holding unit 304 may receive tube 312 and swage fitting 314 in a manner that aligns them axially to each other. Being axially aligned means that an axis through a central portion of tube 312 also may run through a central portion of swage fitting 314. Further, holding unit 304 also may lock or hold tube 312 in place.

In this example, housing unit 304 includes shaped channel 316 and cover 318. Cover 318 is a moveable cover attached to shaped channel 316 through hinge 320. When cover 318 is closed with respect to shaped channel 316, tube 312 may be held in a fixed location with respect to housing 302. In other words, tube 312 may be held in place in shaped channel 316 when cover 318 is closed over tube 312 in a manner that tube 312 is unmovable.

In this example, moveable member 306 may move swage fitting 314 axially with respect to tube 312. Moveable member 306 moves axially along the housing with respect to tube 312 and swage fitting 314. In other words, holding unit 304 is capable of aligning tube 312 with swage fitting 314 along an axis.

Tube 312 may be an inflexible tube. An inflexible tube may be inflexible throughout the whole length or only through a portion of the length. In these examples, an inflexible tube is one that is inflexible through at least a portion where a connection is made to a swage fitting. Of course, the different advantageous embodiments may be applied to any type of tube that may be connected to a swage fitting. Tube 312 may be, for example, a metal tube, a plastic tube, or a composite tube. If tube 312 is a metal tube, the metal may be made of, for example, copper, steel, aluminum, titanium, an alloy, or some other suitable metal material.

Swage fitting 314 may be implemented using an axial swage fitting from any currently available source or swage fittings. This fitting may be made from various materials, such as, for example, copper, steel, aluminum, titanium, an alloy, or some other suitable metal material.

Moveable member 306 may move swage fitting 314 towards tube 312. Moveable member 306 in these examples may be axial force generation unit 322. Axial force generation unit 322 may include shaped channel 324. Shaped channel 324 may be shaped or forced to receive swage fitting 314.

With swage fitting 314 in place within shaped channel 324, axial force generation unit 322 may move in a manner to apply an axial force on swage fitting 314 to move swage fitting 314 towards tube 312 in holding unit 304.

In these illustrative examples, moveable member 306 may move along slot 326 in an axial motion with respect to holding unit 304. In other words, moveable member 306 may move towards and away from holding unit 304 in these examples.

Although in these examples, moveable member 306 is described as moving swage fitting 314 towards tube 312, other advantageous embodiments may not move swage fitting 314. Instead, swage fitting 314 may be axially aligned in place with tube 312. With this type of implementation, the movement of linear force generator 308 causes swage fitting 314 and/or tube 312 to deform in a manner to create the connection between these two components.

Moveable member 306 may be moved by linear force generator 308. Linear force generator 308 in these examples translates rotational force into linear forces. The linear force in these illustrative examples is along the axis for tube 312 and swage fitting 314. Linear force generator 308 may be, for example, screw element 328 which engages threads 330 in axial force generation unit 322. In the depicted examples, screw element 328 may include a screw and any other component that may be used to allow the screw to rotate.

When screw element 328 rotates, axial force generation unit 322 may move backwards and forwards in slot 326 in an axial motion with respect to tube 312 and swage fitting 314. Of course, linear force generator 308 also may be implemented using other components such as, for example, a ball spline.

In these examples, linear force generator 308 may be powered by motor unit 310. In this example, motor unit 310 may be connected to housing unit 302. More specifically, motor unit 310 may connect to and provide rotational force to linear force generator 308 in these examples. Motor unit 310 may be, for example, torque ratchet 332. Of course, motor unit 310 may take other forms. For example, without limitation, motor unit 310 may be a portable drill, a motorized screwdriver, or some other suitable type of motor.

Motor unit 310 may be electrically powered using battery 334. In other advantageous embodiments, motor unit 310 may be electrically powered using an alternating current source. In yet other advantageous embodiments, motor unit 310 may be, for example, an air motor. With this type of motor, linear force generator 308 may take the form of a ball spline to provide the rotational force to linear force translation to move axial force generation unit 322.

Further, sensing mechanism 336 may be included in linear force generator 308 to apply a force up to a set or predetermined level in locking or creating a connection between tube 312 and swage fitting 314.

The illustration of swaging apparatus 300 in FIG. 3 is provided for purposes of illustrating functional components for different advantageous embodiments. This illustration in FIG. 3 is not meant to imply physical or architectural limitations as to the manner in which swaging apparatus 300 may be implemented. For example, in other advantageous embodiments, motor unit 310 may be incorporated within housing 302. As another example, holding unit 304 may be formed as part of housing 302. In other embodiments, holding unit 304 may be a separate component attached to or bonded to housing 302.

Figure 4:
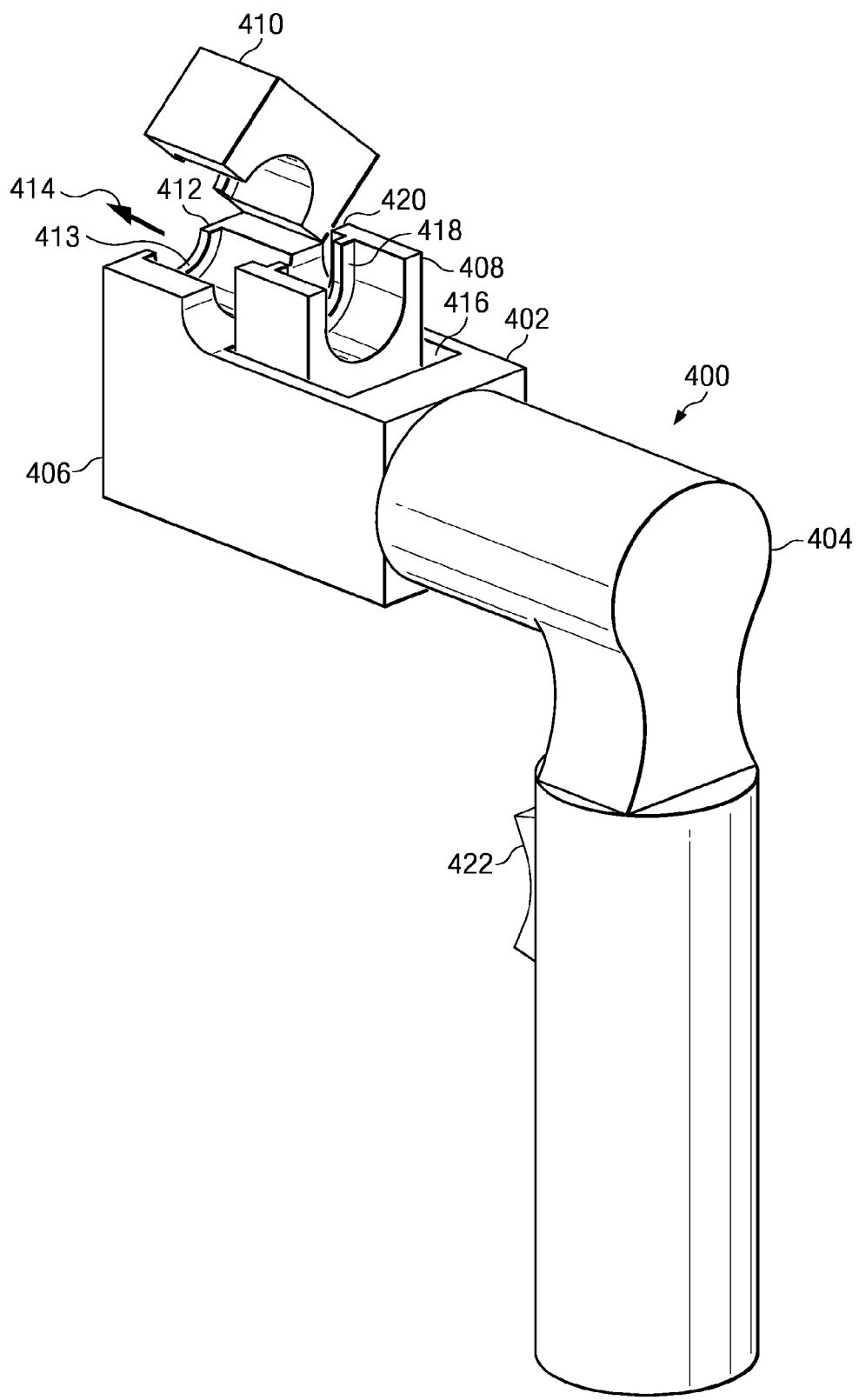
FIG. 4 is an illustration of a swaging apparatus in accordance with an advantageous embodiment.

With reference now to FIG. 4, an illustration of a swaging apparatus is depicted in accordance with an advantageous embodiment. In this example, swaging apparatus 400 is an example of one implementation of swaging apparatus 300 in FIG. 3.

As illustrated, swaging apparatus 400 includes housing 402 and motor unit 404. In this depicted example, housing 402 may be engaged or disengaged from motor unit 404. Motor unit 404 takes the form of a torque ratchet in this example.

Housing 402 includes holding unit 406 and axial force generation unit 408. As illustrated, holding unit 406 includes cover 410, which is moveable with respect to shaped channel 412. Holding unit 406 may receive an inflexible tube, such as tube 312 in FIG. 3. Shaped channel 412 includes slot 413, which may be used to engage or hold tube 312 in place when axial force is applied along axis 414. Although a slot is illustrated in these examples, any mechanism that may engage and hold a tube in place may be employed within holding unit 406.

Axial force generation unit 408 may move axially along axis 414 within slot 416. In this example, axial force generation unit 408 also includes channel 418 to allow a swaged fitting to be placed within axial force generation unit 408. Slot 420 in axial force generation unit 408 may hold and force or move a swage fitting towards a tube held within holding unit 406 when axial force generation unit 408 is moved towards housing 402. This movement may cause the swage fitting to be connected to the inflexible tube. Switch 422 on motor unit 404 may activate motor unit 404 to apply rotational force to move axial force generation unit 408 along axis 414 within slot 416.

Figure 5:
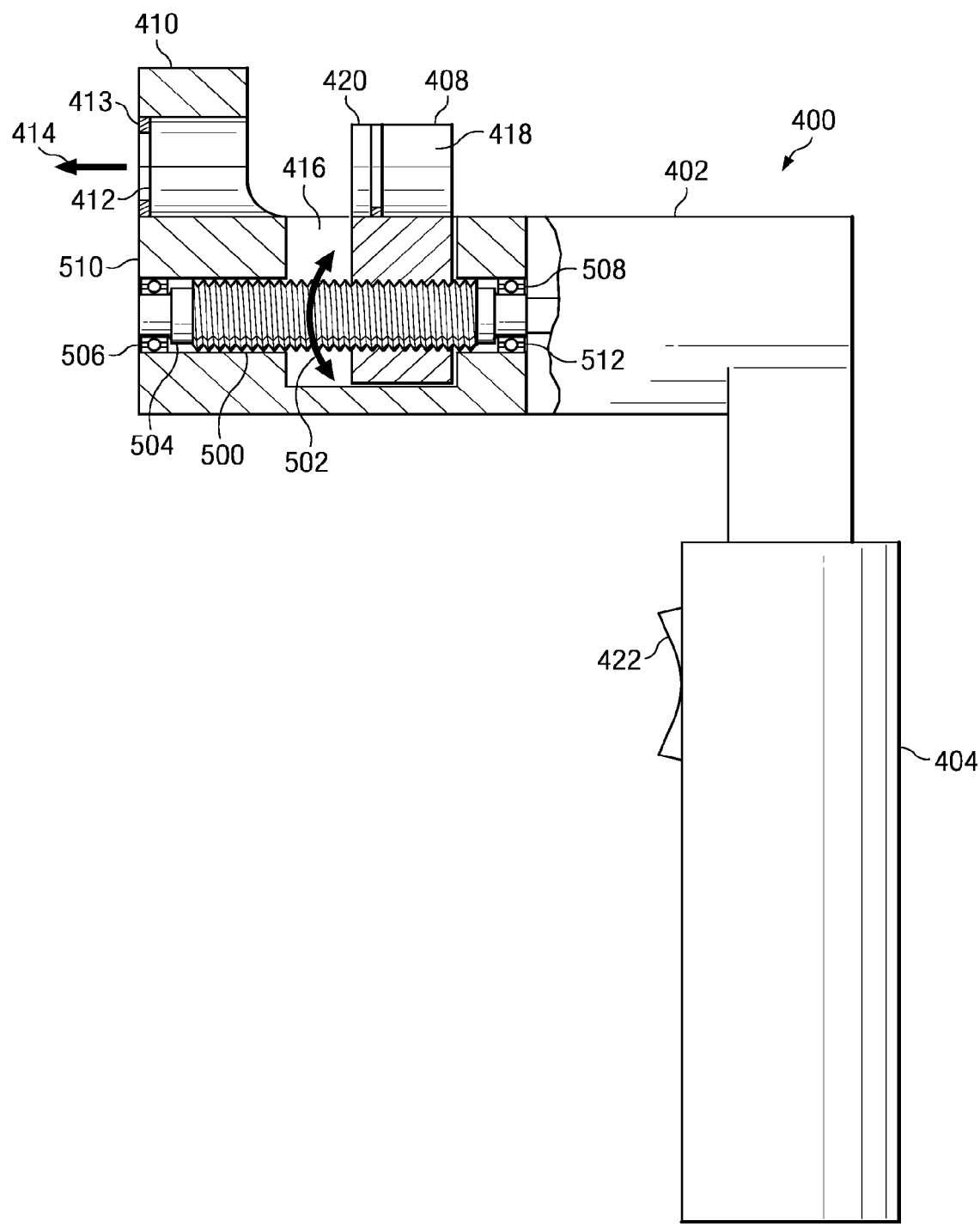
FIG. 5 is a side view of a swaging apparatus in accordance with an advantageous embodiment.

With reference now to FIG. 5, a side view of a swaging apparatus is depicted in accordance with an advantageous embodiment. In this example, swaging apparatus 400 is shown in a partially exposed side view.

Axial force generation unit 408 may be moved axially along axis 414 by screw element 500. Screw element 500 is an example of one implementation of linear force generator 308 in FIG. 3 used to convert rotational force into linear force. The rotational force may be applied along the direction of arrow 502 with the linear force being along the direction of axis 414.

Screw element 500 may turn in the direction of arrow 502 when engaged to motor 404. In these examples, screw 502 may provide the rotation to linear force translation to move axial force generation unit 408 along arrow 414. Screw element 500 turns along arrow 502 to move axial force generation unit 408 along axis 414.

In this illustration, screw 502 is located within channel 504. Bearings 506 and 508 in sections 510 and 512 allow screw 500 to rotate within channel 504.

Figure 6:
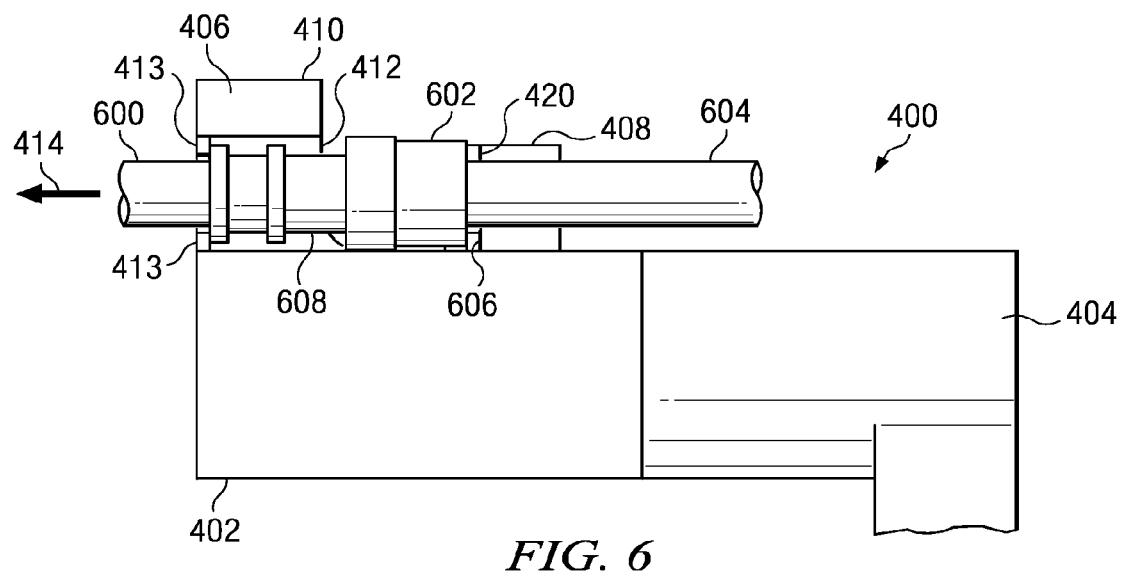
FIG. 6 is a partial view of a swaging apparatus in accordance with an advantageous embodiment.

With reference now to FIG. 6, a partial view of a swaging apparatus is depicted in accordance with an advantageous embodiment. In this example, tube 600 and swage fitting 602 are placed onto swaging apparatus 400. As depicted, tube 600 may be held in place in slot 413 within shaped channel 412 of holding unit 406. In this example, cover 410 is closed in place to lock or hold tube 600 in a position relative to housing 400. Holding unit 406 may hold or prevent tube 600 from moving axially along axis 414.

Figure 7:
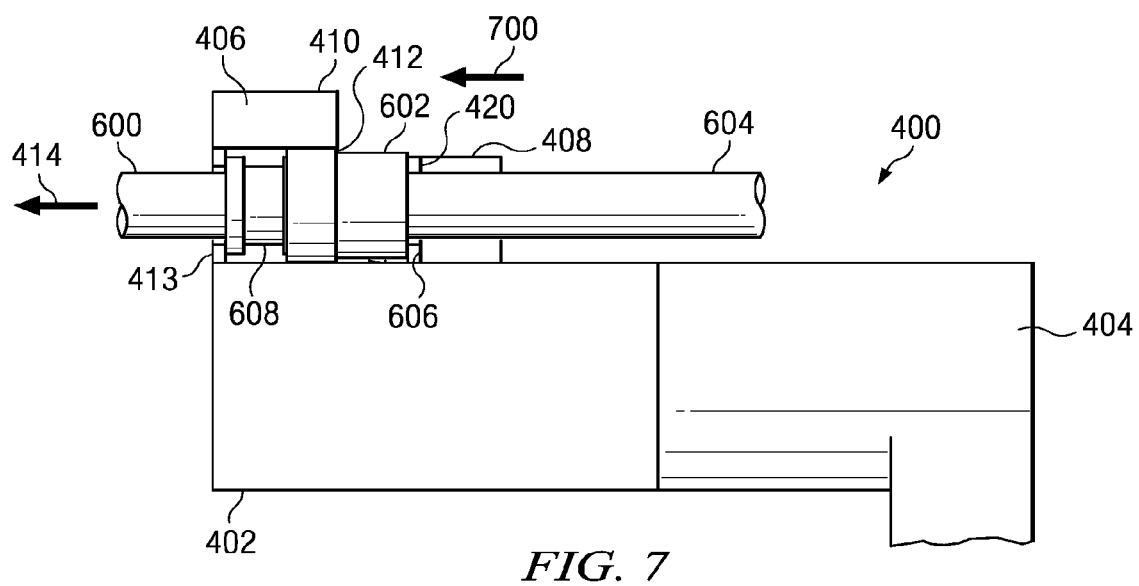
FIG. 7 is a diagram illustrating a movement in a swaging operation in accordance with an advantageous embodiment.

With reference next to FIG. 7, a diagram illustrating a movement in a swaging operation is depicted in accordance with an advantageous embodiment. As can be seen in this illustrative example, axial force generation unit 408 is moved in the direction of arrow 700 such that fitting 602 moves towards tube 600 in an axial fashion along axis 414.

As swage fitting 602 moves in the direction of arrow 700, swage fitting 602 encompasses and deforms a portion of tube 600 to create a connection between these two components. Tube 600 is an inflexible tube, in this illustrative example. In these examples, inflexible means that a portion of tube 600 may deform to create a connection with swage fitting 602. This connection may be a sealed and/or air tight connection that prevents fluids from seeping out from this connection.

In the different advantageous embodiments, swage fitting 602 also may be deformed to form the connection with tube 600. This connection may prevent liquids or fluids from leaking out of the connection.

In this example, tube 604 is already connected to end 606 of swage fitting 602, while tube 600 remains to be connected to end 608 of swage fitting 602.

Figure 8:
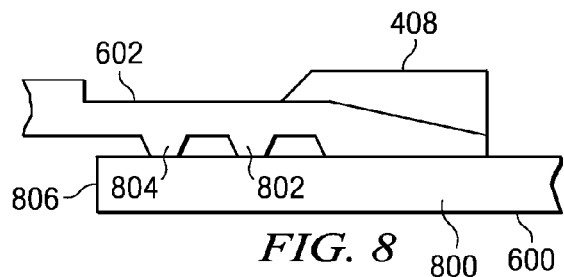
FIG. 8 is a partial cross-sectional view of a tube and a swage fitting in accordance with an advantageous embodiment.

With reference now to FIG. 8, a partial cross-sectional view of a tube and a swage fitting is depicted in accordance with an advantageous embodiment. In this example, a cross-sectional view of a portion of swage fitting 602 and tube 600 is illustrated. Axial force generation unit 408 may push swage fitting 602 in direction 800.

Figure 9:
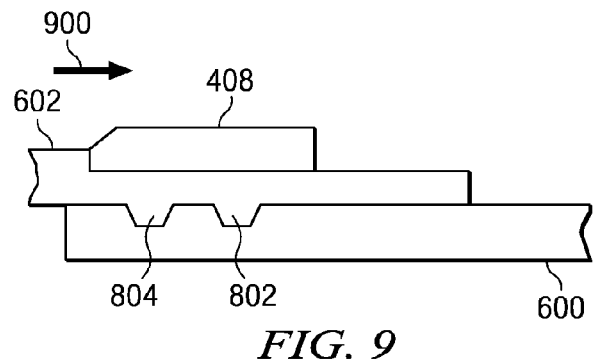
FIG. 9 is a diagram illustrating a connection between a swage fitting and a tube in accordance with an advantageous embodiment.

With reference now to FIG. 9, a diagram illustrating a connection between a swage fitting and a tube is depicted in accordance with an advantageous embodiment. Axial force generation unit 408 may move in the direction of arrow 900 as shown in FIG. 9. Swage fitting 602 deforms along with tube 600 to connect swage fitting 602 to tube 600. This connection is a sealed connection and fluid may not leak from the connection.

In this example, swage fitting 602 includes ridges 802 and 804. These ridges may deform surface 806 of tube 600 to create a connection. Further, swage fitting 602 also may deform in this operation. In some embodiments, swage fitting 602 may move relative to tube 600.

In other advantageous embodiments, swage fitting 602 may not move relative to swage fitting 600 and merely cause a deformation to tube 600 to create the connection. With this type of embodiment, swage fitting 602 also may deform in creating the connection. In the different advantageous embodiments, any currently available type of swage fitting may be used along with any currently available type of tube in creating these connections.

The illustration of details for swage fitting 602 are presented for purposes of illustrating one manner in which a connection may be made between a swage fitting and a tube using a swaging process in accordance with an advantageous embodiment. This illustration is not meant to limit the architecture or shape of swage fittings that may be used. Any type of swage fitting and/or tube that is currently available may be used in creating connections in the different advantageous embodiments.

Figure 10:
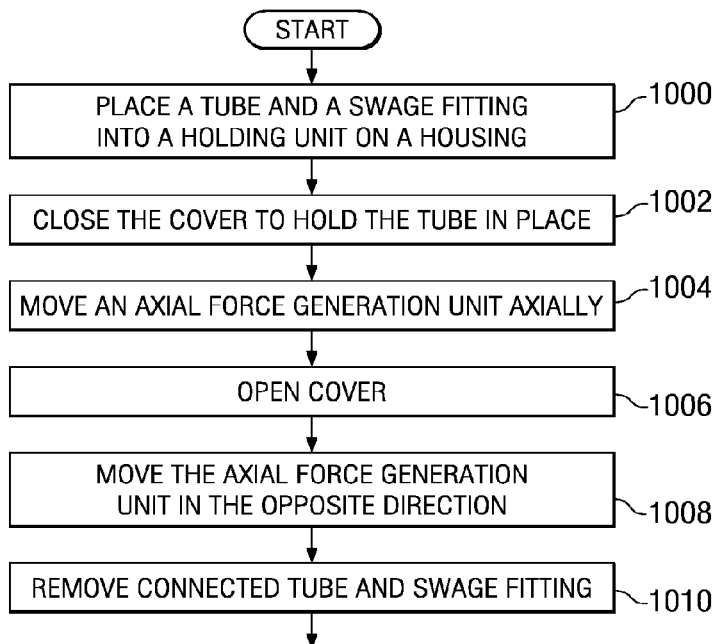
FIG. 10 is a flowchart of a process for creating a connection between an inflexible tube and a swage fitting in accordance with an advantageous embodiment.

With reference now to FIG. 10, a flowchart of a process for creating a connection between an inflexible tube and a swage fitting is depicted in accordance with an advantageous embodiment. The process illustrated in FIG. 10 may be implemented using a swaging apparatus, such as swaging apparatus 300 in FIG. 3.

The process begins by placing a tube and a swage fitting into a holding unit on a housing (operation 1000). The cover is then closed to hold the tube in place (operation 1002). An axial force generation unit is then moved axially towards the holding unit to cause the swage fitting to deform the inflexible tube in a manner that connects the swage fitting to the tube (operation 1004). The cover is then opened (operation 1006) and the axial force generation unit is moved axially in the other direction (operation 1008). The connected tube and the swage fitting are then removed (operation 1010) with the process terminating thereafter.

The illustration of the process in FIG. 10 to create a connection between a tube and a swage fitting is presented for depicting one manner in which a connection may be generated using a swaging apparatus in accordance with an advantageous embodiment. Of course, more steps may be included, omitted, or steps may be changed in creating a connection. For example, operation 1010 may be performed before operation 1008 in some examples. An additional step may include moving the axial force generation unit axially prior to replacing the inflexible tube and the swage fitting into the holding unit.

Thus, the different advantageous embodiments provide a method and apparatus for creating a connection between an inflexible tube and a swage fitting. In these examples, the swaging apparatus may include a housing, holding unit, and a moveable member. As described above, the holding unit may receive and hold an inflexible tube and a swage fitting. The moveable member may move axially along the housing with respect to an axis for the inflexible tube and the swage fitting to connect the swage fitting to the inflexible tube and create a seal between the swage fitting and the inflexible tube.

Depending on the particular implementation, the swage fitting may or may not move relative to the tube when moveable member moves axially along the housing. Moveable member causes a deformation in the tube and/or swage fitting to create a connection between these components in the different illustrative examples.

In these different advantageous embodiments, this swaging apparatus may be a handheld tool and may be totally portable without requiring a connection to a separate power source. Further, the different advantageous embodiments provide an ability for a single operator to create connections as compared to currently used methods and techniques.

The description of the different advantageous embodiments has been presented for purposes of illustration and description, and is not intended to be exhaustive or limited to the embodiments in the form disclosed. Many modifications and variations will be apparent to those of ordinary skill in the art. For example, although the creation of connections between tubes and swage fitting have been described with respect to aircraft, these types of connections may be applied to other types of items that may be manufactured.

For example, without limitation, connections may be made using the method and apparatus of the advantageous embodiments to create connections for systems located in buildings, submarines, cars, trucks, ships, manufacturing plants, and other suitable items. These connections may be for various systems that may be found in the items, such as, for example, air conditioning systems, water systems, electrical systems, hydraulic systems, and other suitable systems.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for creating a connection between a swage fitting and an inflexible tube, the method comprising:
    placing the inflexible tube and the swage fitting into a holding unit on a housing, wherein the inflexible tube and the swage fitting are axially aligned to each other; and
    moving a moveable member axially, wherein a movement of the moveable member towards the holding unit causes the swage fitting to deform the inflexible tube to connect the swage fitting to the inflexible tube, wherein moving the moveable member axially comprises rotating a screw element to cause the movable member to move axially towards the holding unit.

2. The method of claim 1 further comprising:
holding the inflexible tube in place in the holding unit.

3. The method of claim 1 further comprising:
attaching a hand-held motor unit to the housing, wherein the hand-held motor unit engages the screw element.

4. The method of claim 1, wherein the holding unit includes a shaped channel such that the holding unit and shaped channel are configured to receive and hold the inflexible tube and the swage fitting.

5. The method of claim 1, wherein the holding unit holds the inflexible tube in a fixed position with respect to the housing and allows the swage fitting to move axially.

6. The method of claim 3, wherein the motor unit is configured to engage and to disengage with the housing.

7. The method of claim 3, wherein the motor unit is an electrically powered motor unit.

8. The method of claim 7, wherein a battery powers the electrically powered motor unit.

9. The method of claim 3, wherein the motor unit is selected from one of a ratchet and a drill.

10. The method of claim 1, further comprising sensing a force between the swage fitting and the inflexible tube.

11. A method for connecting a swage fitting and an inflexible tube, the method comprising:
placing the inflexible tube and the swage fitting into a holding unit on a housing, the placing the inflexible tube and the swage fitting axially aligning each to the other along an axis; and
moving a moveable member axially, the moving the moveable member causing the swage fitting to deform the inflexible tube so as to connect the swage fitting to the inflexible tub;
wherein moving a moveable member axially includes a force motion generator selected from one of a screw element and a ball spline and located within the housing, the force motion generator coupled to the moveable member and moving the movable member axially along an axis.

12. The method of claim 11, wherein the holding unit holds the inflexible tube in a fixed position with respect to the housing and allows the swage fitting to move axially.

13. The method of claim 11, wherein a hand-held motor unit engages the screw element so that the hand-held motor unit is configured to engage and to disengage with the housing.

14. The method of claim 13, wherein the motor unit is an electrically powered motor unit.

15. The method of claim 14, wherein a battery powers the electrically powered motor unit.

16. A method for creating a connection between a swage fitting and an inflexible tube, the method comprising:
placing the inflexible tube and the swage fitting into a holding unit on a housing, wherein the inflexible tube and the swage fitting are axially aligned to each other; and
moving a moveable member axially, wherein the movement of the moveable member towards the holding unit causes the swage fitting to deform the inflexible tube to connect the swage fitting to the inflexible tube,
wherein moving a moveable member axially includes a force motion generator selected from one of a screw element and a ball spline and located within the housing, the force motion generator coupled to the moveable member and moving the moveable member axially along an axis.

* * * * *